United States Patent [19]
Kluth

[11] Patent Number: 4,477,840
[45] Date of Patent: Oct. 16, 1984

[54] VIDEO RECORDER

[75] Inventor: Hans-Jürgen Kluth, Garbsen, Fed. Rep. of Germany

[73] Assignee: Licentia Patent-Verwaltungs-GmbH, Frankfurt am Main, Fed. Rep. of Germany

[21] Appl. No.: 366,083

[22] Filed: Apr. 6, 1982

[30] Foreign Application Priority Data

Apr. 6, 1981 [DE] Fed. Rep. of Germany ....... 3113862
May 30, 1981 [DE] Fed. Rep. of Germany ....... 3121600

[51] Int. Cl.³ .................... H04N 9/493; H04N 7/04
[52] U.S. Cl. .................................... 358/330; 358/144
[58] Field of Search ............... 360/19.1; 358/330, 310, 358/14, 16, 343, 143, 144, 142

[56] References Cited

U.S. PATENT DOCUMENTS 4,208,671 6/1980 Ozawa et al. ........................ 358/330

FOREIGN PATENT DOCUMENTS 3011635 10/1981 Fed. Rep. of Germany .
41084 8/1980 Japan ................................... 358/310
2098376 3/1981 United Kingdom ............... 360/19.1

*Primary Examiner*—John C. Martin
*Assistant Examiner*—Erin A. McDowell
*Attorney, Agent, or Firm*—Spencer & Frank

[57] ABSTRACT

In a video tape recorder for recording a television signal composed of a picture carrier which has been frequency modulated with a video luminance signal, a chrominance subcarrier which has been modulated with a chrominance signal, and a plurality of audio carrier signals each composed of an audio carrier which has been frequency modulated with a respective audio signal along a recording track, and for playing such a signal, there are provided a recorder portion including circuits for reducing the audio carrier signals in frequency by difference formation of the television signal audio carrier signals with a stabilized reference frequency signal, and for recording the reduced frequency audio carrier signals with their original frequency separation in a frequency band located, in the recorded signal, essentially between the frequency spectrum of the chrominance subcarrier and a location in the frequency spectrum of the picture carrier, and a playback portion including circuits for returning the reduced frequency audio carrier signals to their original frequency levels by sum formation with the reference frequency signal.

18 Claims, 20 Drawing Figures

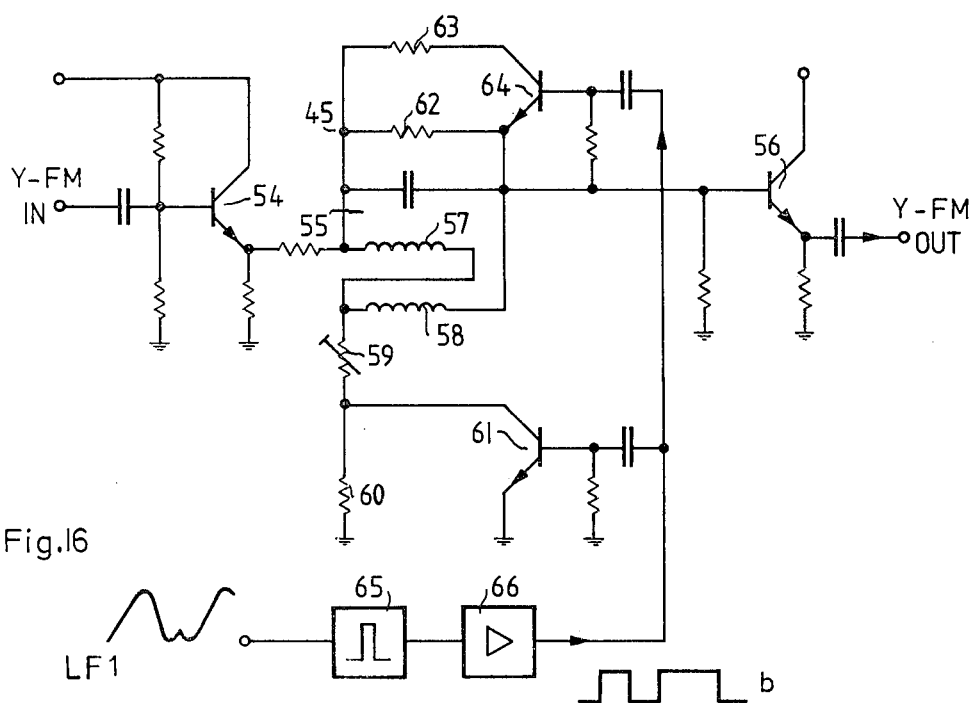
Fig.16
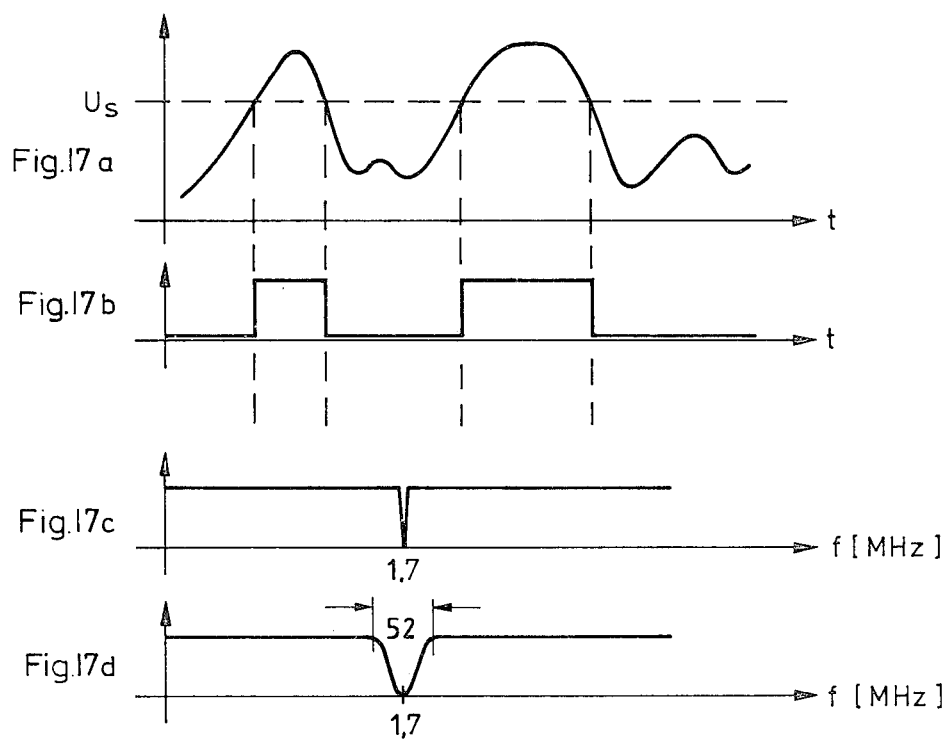

VIDEO RECORDER

BACKGROUND OF THE INVENTION

The present invention relates to video tape recorders of the type provided with a pair of rotatable heads. It is known that in video tape recorders the video signal is recorded by frequency modulating a picture carrier and recording the modulated carrier along oblique tracks which extend obliquely at a predetermined angle, which is about 6° for VHS devices, to the longitudinal direction of the tape. Preferably one picture field, for example, is recorded along each such oblique track. Recording and playback are effected with rotating heads, there being two heads in the VHS system which are alternatingly in contact with the oblique tracks. In this way the high relative speed between head and tape required for video recordings is achieved with a relatively slow tape advance.

In such devices, the audio signal is recorded by a stationary head on a longitudinal track having a width of about 1 mm and extending parallel to the edge of the tape. The audio signal is played back by a similar stationary head. Thus, it is the relatively low longitudinal velocity of the tape, and not the substantially high relative speed between the rotating video signal heads and tape on the oblique tracks, which is a major factor in the recording and playback of the audio signal.

Recorders which are presently on the market can operate with tape advance velocities of the order of magnitude of 2 cm/s and less in order to increase the total playing time of the tape. This low relative speed between tape and audio head has a disadvantageous effect on the quality of the recorded audio signal. High fidelity sound quality is practically impossible to achieve with such a low relative speed. The recorded audio signal only has a frequency range of about 70 Hz to 10 kHz. Due to the narrow physical width of the longitudinal track, the associated signal to noise ratio is also relatively poor and becomes even worse if two audio signals are recorded for stereo playback or bilingual playback since the width of each channel is then of necessity half that of the longitudinal track.

It is conceivable to record the audio signal in a manner similar to that employed for video discs on the oblique tracks together with the picture carrier. However, such a solution has not yet been successfully reduced to practice. On the one hand, the available frequency band is already utilized completely. The range from 0-1.3 MHz is taken up by the reduced-frequency, quadrature modulated chrominance subcarrier and the rest of the frequency band is occupied by the frequency spectrum of the modulated picture carrier.

Recording of an audio, or sound, carrier in the remaining narrow frequency gap between the modulated chrominance subcarrier and the frequency spectrum of the picture carrier is practically impossible because of the required steep filter band edges for the chrominance subcarrier and picture carrier due to the occurring phase and group delay errors. On the other hand, if the audio signal is recorded on the oblique tracks there results considerable interference during playback due to the switching between video heads, which does not interfere with picture playback because it takes place during or shortly before the vertical blanking periods.

During playback of the audio signal, however, this switching of heads becomes audible as an annoying noise component because the playback of the audio signal, which is modulated, for example, on a carrier, is temporarily interrupted due to the switching of heads or is subjected to phase shifts. The resulting spike-type interference pulses at a fundamental frequency of 50 Hz with a large harmonics content produce a continuous, annoying noise during audio playback.

It has been proposed, as disclosed in pending U.S. application Ser. No. 360,171 filed by me on Mar. 19, 1982, entitled Video Recorder and claiming priority of Federal Republic of Germany application No. P 31 10 968.3 of Mar. 20, 1981, to provide for recording of the audio signal on the oblique tracks with improved quality and without interference from the switching of heads in that the output signals of the two rotating heads on the audio signal path are amplified differently to such an extent that the audio signals, when added or subtracted, respectively, cannot cancel one another out in the overlap region.

Although this makes possible recording and playback of the audio signals at high fidelity quality, there still remains the drawback known in connection with the prior art audio recording methods, that the processing of audio signals for recording and playback is associated with a reduction in quality, for example a susceptibility to noise.

SUMMARY OF THE INVENTION

It is an object of the present invention to improve the quality of the audio recording on such tapes.

The above and other objects are achieved, according to the invention, in a video tape recorder for recording a television signal composed of a picture carrier which has been frequency modulated with a video luminance signal, a chrominance subcarrier which has been modulated with a chrominance signal, and a plurality of audio carrier signals each composed of an audio carrier which has been frequency modulated with a respective audio signal along a recording track, and for playing such a signal, by the provision of a recorder portion including means for reducing the audio carrier signals in frequency by difference formation of the television signal audio carrier signals with a stabilized reference frequency signal, and for recording the reduced frequency audio carrier signals with their original frequency separation in a frequency band located, in the recorded signal, essentially between the frequency spectrum of the chrominance subcarrier and a location in the frequency spectrum of the picture carrier, and a playback portion including means for returning the reduced frequency audio carrier signals to their original frequency levels by sum formation with the reference frequency signal.

A central feature of the invention essentially resides in that the audio carriers are inserted, in their spacing and modulation prescribed by the standard, into the gap in the recording spectrum existing between the luminance signal spectrum and the chrominance signal spectrum and this gap is broadened at the expense of the upper sideband of the chrominance signal corresponding to this spacing, with the correct position of the audio carrier frequency being obtained by a difference formation between the standard audio carrier frequency (for CCIR 5.5 or 5.742 MHz, respectively) and a reference frequency, for example in the PAL system the chrominance subcarrier frequency of 4.43 MHz. "CCIR" is the name of an organisation dealing with standardisation of broadcasting systems. The abbreviation "CCIR" is derived from "Comité Consultatif International des Radiocommunication".

Although a change in the upper sideband of the chrominance signal spectrum results in theoretical errors, it has been found that these errors are practically unnoticeable in the resulting playback picture. In PAL receivers the color television principle compensates for such errors even if they are large and for NTSC and SECAM the error is not yet large enough to actually be found annoying.

Advantages of the device according to the invention can be listed as follows:

the quality of the original sound transmission remains the same;

a compander system is not required;

automatic recording level regulation is not required;

two FM modulators for the RF converter are not required;

the generation of a new pilot signal is not required;

the two longitudinal audio recording tracks are not required;

the audio head is not required.

In the present invention, the high relative speed between the heads and the tape enables the available bandwidth for the picture signal to advantageously also be utilized for recording the audio signals on the oblique tracks. By recording the audio signals at high frequencies, and omitting any demodulation and remodulation, high fidelity sound quality can be realized. A further advantage is that the previously required longitudinal track for recording the audio signal can be omitted. Thus, either an additional region of the magnetic tape can be utilized for recording the picture signal or this region can be utilized for some other purpose. In this way it is possible to either improve the quality of the video recording or to reduce tape width. A particularly good utilization of the magnetic tape can be realized if, as disclosed in German Offenlegungsschrift [Laid-Open Application] No. 3,011,635, the previously additionally used synchronizing track parallel to the tape edge to mark the oblique tracks is omitted and the signal which marks the individual oblique tracks as required to regulate the head is derived by utilizing the so-called azimuth angle. In this way a video recorder can be equipped only with rotating heads for recording the oblique tracks, i.e. without the additional recording heads for the longitudinal tracks such as, for example, for audio recording or for the sync track. The tape area thus made available makes it possible to increase the tape playing time by about 16% while retaining the same picture quality and the same tape length. That means, for a cassette intended for 4 hours of playing, achievement of an additional playing time of 40 minutes.

The recording of the audio signal in FM makes it possible to substantially compensate amplitude fluctuations in the recorded audio carrier by amplitude limiting. This type of modulation is also one of the bases of a solution to the problem in question. The different gains in the two head output signals introduced for error removal is limited again during the frequency demodulation.

One embodiment of the invention will now be explained in greater detail with the aid of the drawings.

BRIEF DESCRIPTION OF THE DRAWING

FIG. 16 is a circuit diagram illustrating one embodiment of a portion of the circuit of FIG. 13.

FIGS. 17a and 17b are signal waveform diagrams illustrating the voltages present at two points in the circuit of FIG 16.

FIGS. 17c and 17d are signal spectrum diagrams illustrating the operation of the circuit of FIG. 16.

DESCRIPTION OF THE PREFERRED EMBODIMENTS

Figure 1:
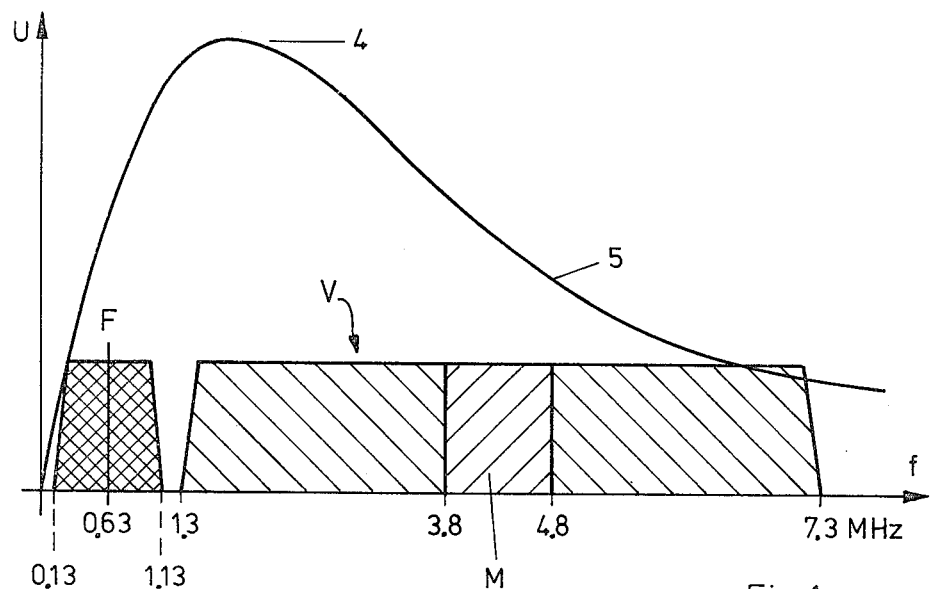
FIG. 1 is a diagram illustrating the frequency spectrum for recording individual signals on the oblique tracks the prior art.

FIG. 1 shows the spectrum of a recorder signal including, in the lower frequency range, a reduced-frequency, quadrature modulated chrominance subcarrier F at a frequency of 0.63 MHz and a bandwidth of about ±500 kHz. The video, or luminance, signal V is recorded by frequency modulation of a picture carrier. Its static modulation characteristic M extends between the frequencies of 3.8 and 4.8 MHz, with 3.8 MHz corresponding to the value beyond black and 4.8 MHz corresponding to the white value of the video signal. The modulation results in a frequency spectrum of 1.3 to 7.3 MHz. As a result of the head gap, the upper sideband, above 6 MHz, is not scanned completely so that interference due to signal reflections is reduced.

In prior art devices, audio signals are not contained in the above spectrum but instead are processed separately and recorded on a longitudinal track extending along one edge of the tape.

Figure 2:
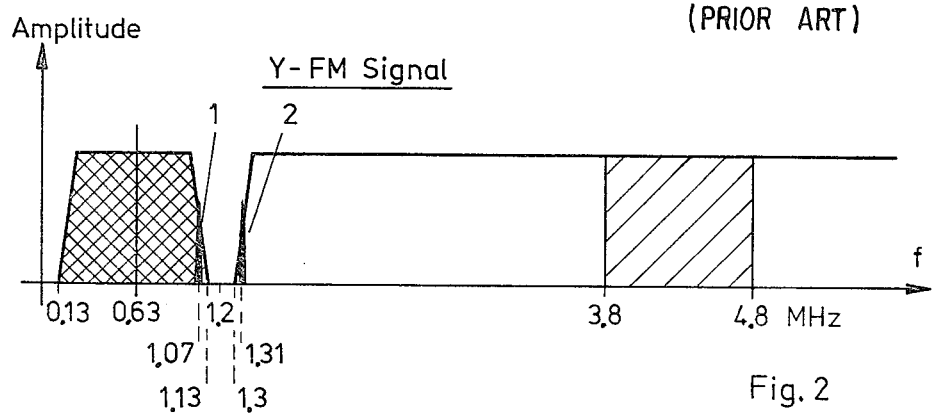
FIG. 2 is a diagram illustrating the position of two audio carriers in a modification of the spectrum of FIG. 1 to the invention.

FIG. 2 shows, to a frequency scale which is enlarged relative to FIG. 1, the spectrum of the luminance signal Y-FM and chrominance signal spectra with an indication of the position of the audio signals introduced according to the present invention.

Within the region of these spectra, two audio carriers 1 and 2 are recorded at the carrier frequencies of 1.07 and 1.31 MHz, each carrier being frequency modulated with a low frequency audio signal. The frequency of each audio carrier is thus at the band edge of a respective one of the chrominance subcarrier and the modulated picture carrier. If a stereo signal formed by FM audio carriers spaced apart by 250 kHz is introduced at the transmitting end, the carriers 1 and 2 should also have a corresponding spacing so as to simplify conversion and thus improve quality. The two low frequency audio signals may represent a monaural signal, a stereo signal or monaural signals in two different languages.

The frequencies of the two audio carriers 1 and 2 lie approximately at the peak 4 of the head/tape frequency response characteristic 5 which is effective on the oblique tracks during recording of the entire signal. This is where there is the least interference between the picture signal and the audio signal because, with reference to the demodulated video signal, the higher frequency picture components occur in this range only during 10% of the transmission period. The frequencies decisive for image sharpness, however, remain unattenuated. At the same time, the video heads of all home video recorders are most sensitive in a range around 2 MHz so that the optimum signal to noise ratio location has been selected for audio playback. Thus, the interchangeability of video cassettes having weakly recorded audio carriers poses no problem within a cassette system.

Figure 3:
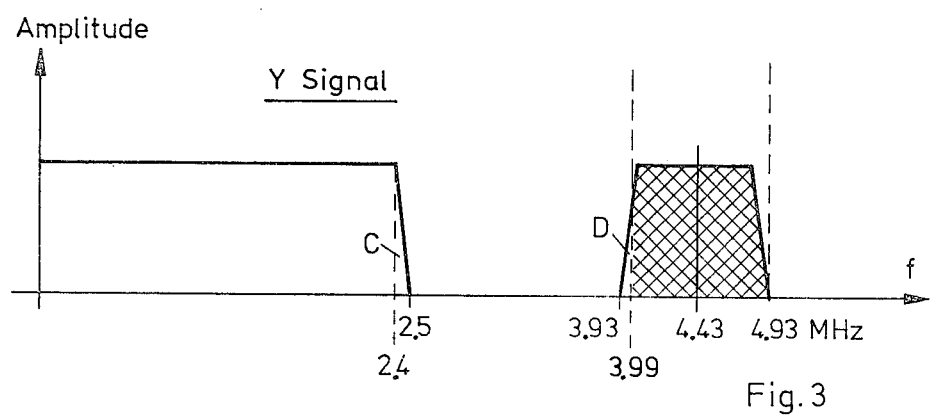
FIG. 3 is a diagram illustrating the effect of the modification of FIG. 2 on the video spectra.

FIG. 3 shows the "bandwidth reductions" for the luminance signal and for the chrominance signal introduced by the present invention in the normal frequency spectrum of the television signal. The reduction of the chrominance signal at D is 0.06 MHz. The reduction of the luminance signal at C is 0.10 MHz. The loss of resolution of the luminance signal is negligible and the single sideband error of the chrominance signal is not noticeable.

Figure 4:
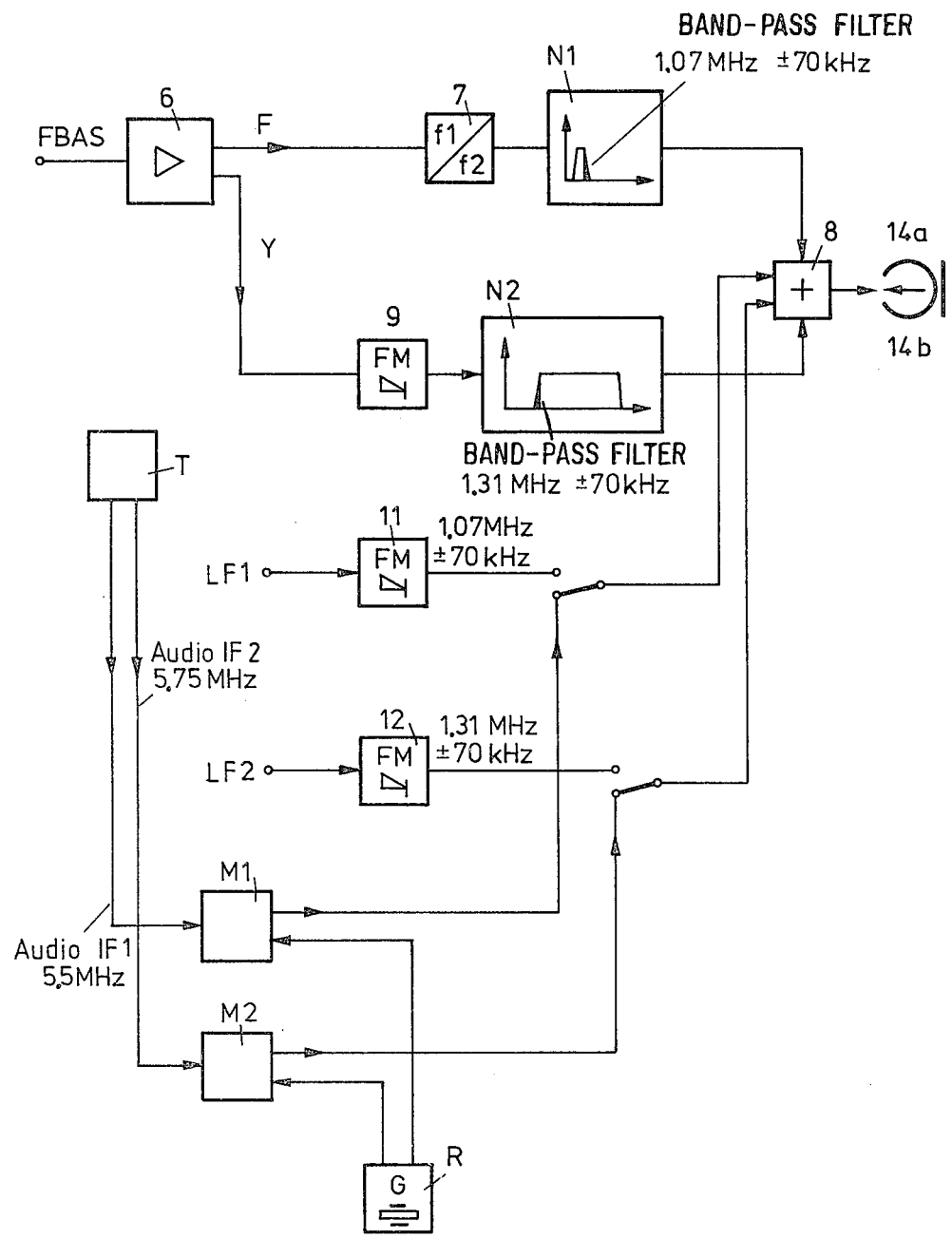
FIGS. 4 and 5 are block circuit diagrams of two embodiments of circuits for recording according to the invention.

In the recording system shown in FIG. 4, an FBAS signal is separated by frequency selective means in a separation circuit 6 into the modulated chrominance subcarrier F and the luminance signal Y. The modulated PAL chrominance subcarrier F is converted in a frequency converter 7 from its original frequency of 4.43 MHz to the frequency of 0.63 MHz and the converted signal is fed to an adder stage 8 via a band-pass filter N1 having an extremely steep edge so as to shift the upper edge of the chrominance signal downward. The luminance signal Y is modulated, in a frequency modulator 9, onto a picture carrier, thus producing a frequency spectrum from 1.3 to 7.3 MHz as shown in FIG. 1. Within this frequency spectrum, a band-pass filter N2 (not shown) having an extremely steep lower frequency edge in a filter circuit 10 shifts the lower edge of the luminance band upward. The remaining signal is likewise fed to the adder stage 8.

Two audio signals LF1 and LF2 coming, for example, from a microphone input, are frequency modulated in two frequency modulators 11 and 12 onto two carriers having the carrier frequencies 1.07 and 1.31 MHz, and the modulated audio signals are likewise fed to the adder stage 8. For a low frequency band of 15 KHz to be transmitted, an FM frequency deviation of ±50 kHZ is selected thus resulting in modulation frequency ranges of 1.07 MHz ±70 kHz and 1.31 MHz ±70 kHz. In order to avoid interference in the Y signal by the two audio carriers, the above-mentioned filter of FIG. 4 suppresses the frequencies associated with the two audio signals.

The output signal of the adder stage 8 includes the signals shown in FIG. 1 and is alternatingly fed to successive ones of the magnetic heads 14a and 14b for recording on a magnetic tape. This signal mixture shown in FIGS. 1 or 2 is then recorded on the oblique tracks of a magnetic tape.

To record audio signals transmitted by television stations and received by a tuner T, mixers and modulators M1 and M2 are provided which convert the received modulated audio carriers 1 and 2, which have been converted to the intermediate frequencies IF1 (5.5 MHz) and IF2 (5.742 MHz) while maintaining the high frequency, to respective frequencies of 1.07 and 1.31 MHz. For this purpose a quartz stabilized reference frequency source R producing a local oscillator signal at a frequency of 4.43 MHz is provided which in PAL devices may be the already existing chrominance subcarrier reference oscillator. The integrated circuit IC MM 1496, made by Motorola, can be used for each mixer M1, M2. The output terminals of the mixers M1 and M2 are connected to the adder stage 8 via respective switches S1 and S2 so that the device can be selectively switched to record either the low frequency audio signals LF or the high frequency audio signals. The source R may also be a separate oscillator.

Figure 5:
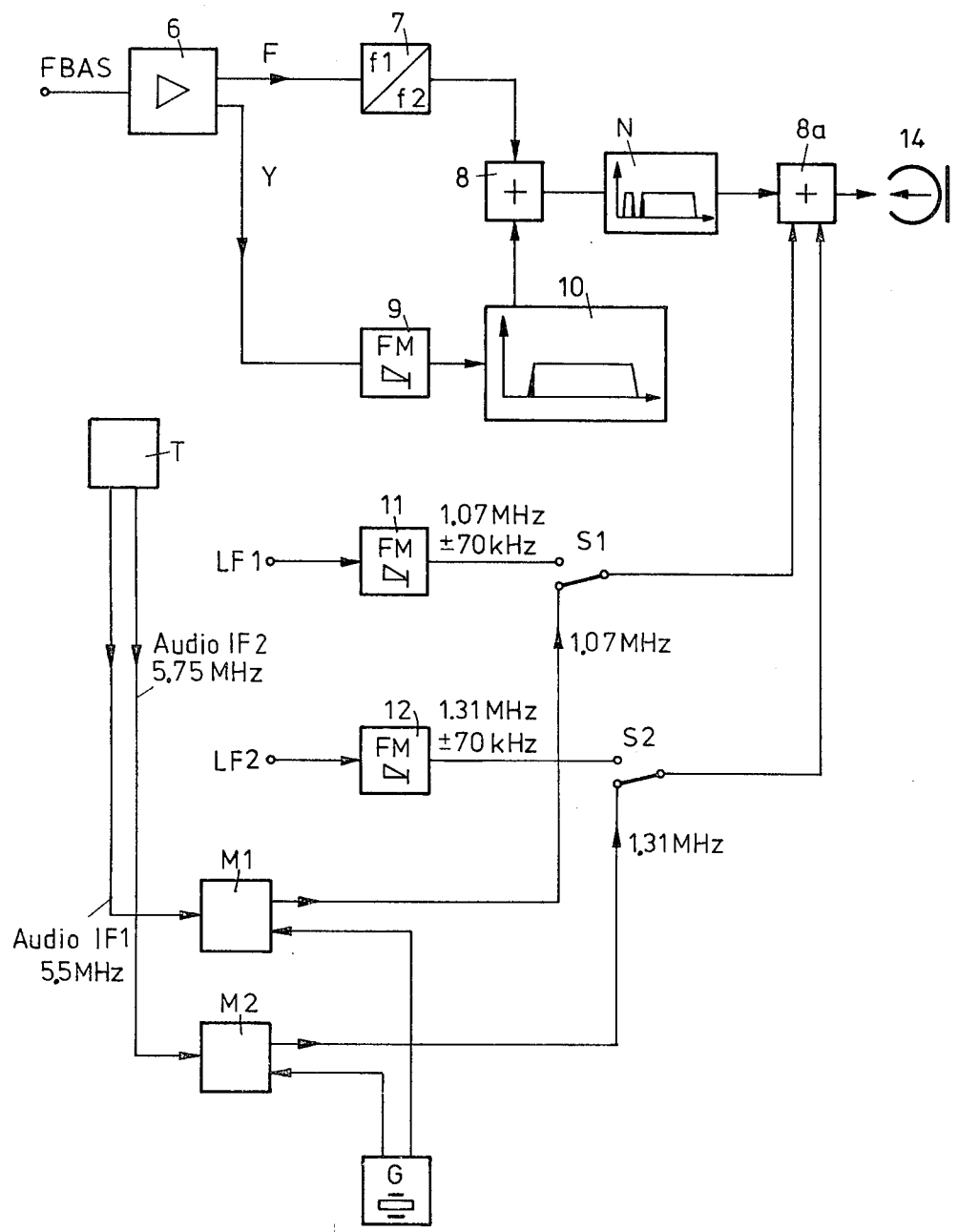

FIG. 5 shows a modification of FIG. 4. The difference between the two embodiments is the use of a single notch filter N for the chrominance and luminance channels. One embodiment of this filter is shown in detail in FIG. 10. For this purpose, the output signals of the frequency converter 7 and of the filter circuit 10 are fed to a first adder stage 8 which, in contradistinction to FIG. 4, does not receive the audio signals. The output of the adder stage 8 is fed to the notch filter N and from there reaches a further adder stage 8a which also receives the audio signals from switches S1 and S2.

Figure 6:
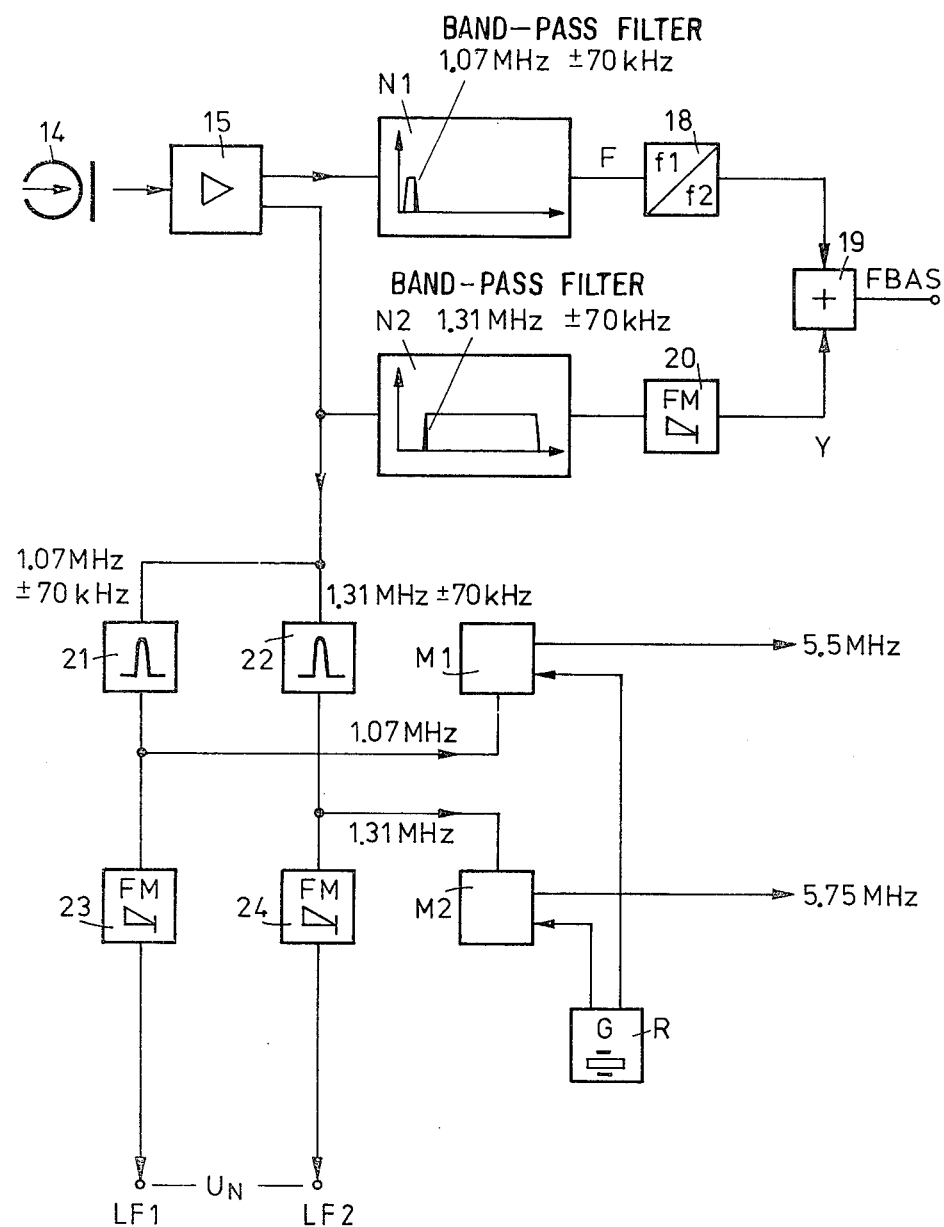
FIGS. 6 and 7 are block circuit diagrams of two embodiments of circuits for playback according to the invention.

FIG. 6 shows one embodiment of a circuit according to the invention for playing back a recorded signal having the spectrum of FIG. 2. The signal alternatingly picked up by heads 14a, 14b is amplified in an amplifier 15 and split by means of separate band-pass filters N1 and N2 each having an extremely steep edge into the chrominance channel and the luminance channel. A frequency converter 18 frequency shifts the frequency of the chrominance signal back to a center frequency of 4.43 MHz and a demodulator 20 demodulates the luminance signal and the resulting signals are fed to an adder circuit 19 in which the FBAS signal is recovered. The further processing is effected in the conventional, known manner.

Before reaching the inputs of the filters N1 and N2, the audio signal is branched off and conducted via narrowband filters 21 and 22 to two mixers M1 and M2 which receive the reference frequency signal from source R to recover the intermediate frequency audio signals Audio IF1 and Audio IF2. These intermediate frequency signals can be fed to the receiver directly or by way of renewed conversion into a receiving channel of the VHF/UHF band. Alternately, the picked-up audio signals can be demodulated directly, if this is required by the recorder, by demodulators 23 and 24.

Figure 7:
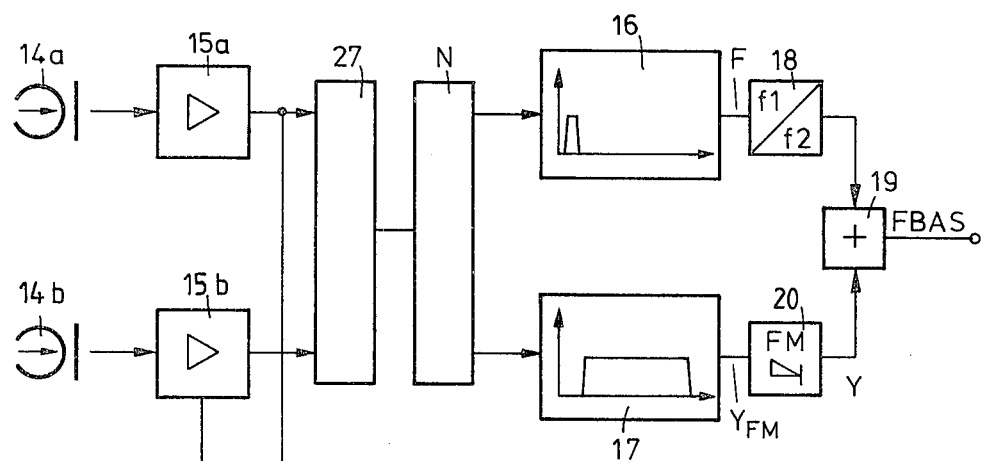

In the playback system shown in FIG. 7, the signal mixture of FIG. 1 is alternatingly picked up by heads 14a and 14b, amplified in amplifier 15a or 15b, respectively, is freed from the audio signal by means of notch filter N and is split by means of bandpass filters 16 and 17 into the modulated chrominance subcarrier F and the modulated picture carrier $Y_{FM}$. Since the change between heads 14a and 14b takes place during the time of the vertical blanking gap, no additional measures are required with respect to the video signals except for providing a hard electronic switch 27 for the head signals of the amplifier outputs 15a and 15b for correct color conversion and FM demodulation.

In the frequency converter 18, the chrominance subcarrier F is frequency converted back to the frequency of 4.43 MHz and fed to the adder stage 19. In the frequency demodulator 20, the luminance signal Y is recovered and fed to the adder stage 19.

Figure 8:
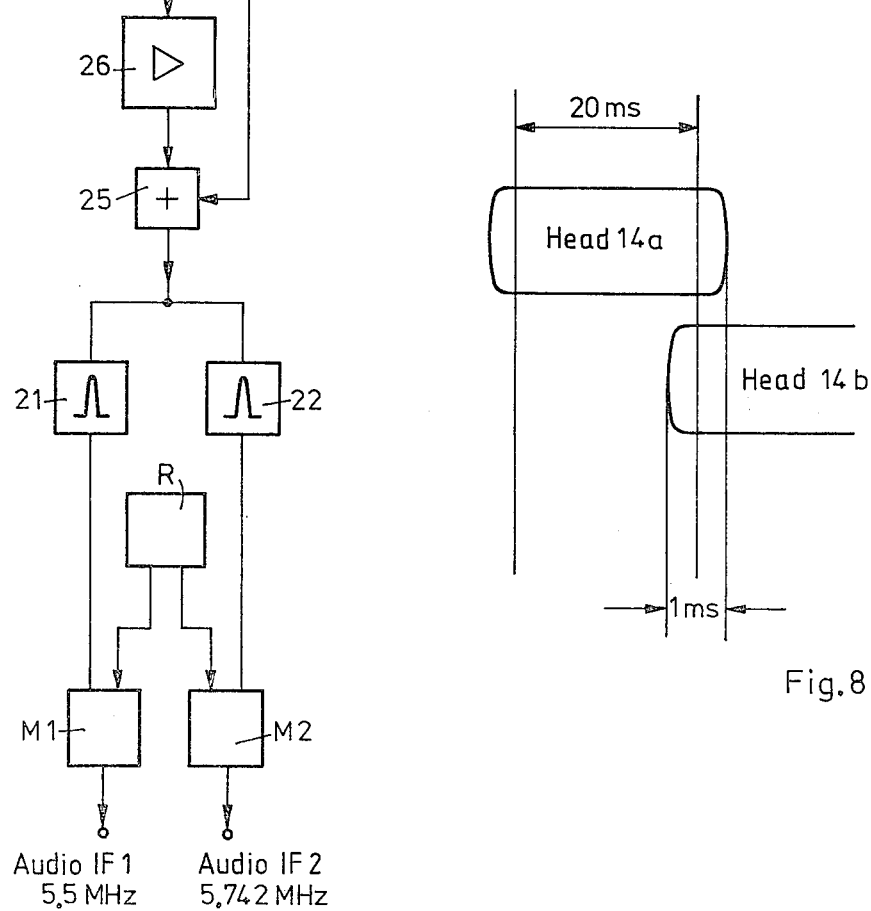
FIG. 8 is a diagram showing the signal segments furnished by respective rotatable heads of a video tape recorder.

The total signal mixture furnished by heads 14a and 14b has overlapping zones in which both heads 14a, 14b have contact with the tape and furnish output signals. FIG. 8 shows this overlapping of the signals furnished by heads 14a and 14b, with the switching points for the luminance and color signals being marked. Because these overlap zones are subject to phase fluctuations, the signal components in these zones may be added together or cancel one another out during addition as both carrier packets are carefully set to the same amplitude due to the chrominance subcarrier information which is transmitted simultaneously in AM with reduced carrier. This cancelling out results in audio interference.

Before the total signal mixture furnished by heads 14a and 14b is fed to any circuit for linearizing the envelope curve of the video signal mixture furnished by the heads, or before it is fed to any device for hard electronic fade-out, this total signal mixture is branched off. Reverting to FIG. 7, the two modulated audio carriers are selectively separated from the signal mixture of FIG. 2 by means of respective narrowband filters 21 and 22 and are fed to mixers M1 and M2. The mixers furnish the two audio signals Audio IF1 and Audio IF2.

The total signal furnished by head 14a or amplifier 15a, before being fed to the filters 21 and 22 is fed into an adder stage 25. The total signal furnished by head 14b or by amplifier 15b, respectively, is fed to an amplifier 26 whose output signal is also fed to the adder stage 25. The output signal of the adder stage 25 now, in any case, is a signal which has an audio signal component even during the head switching phase so that the otherwise unavoidable 50 Hz interference cannot occur.

Figure 9:
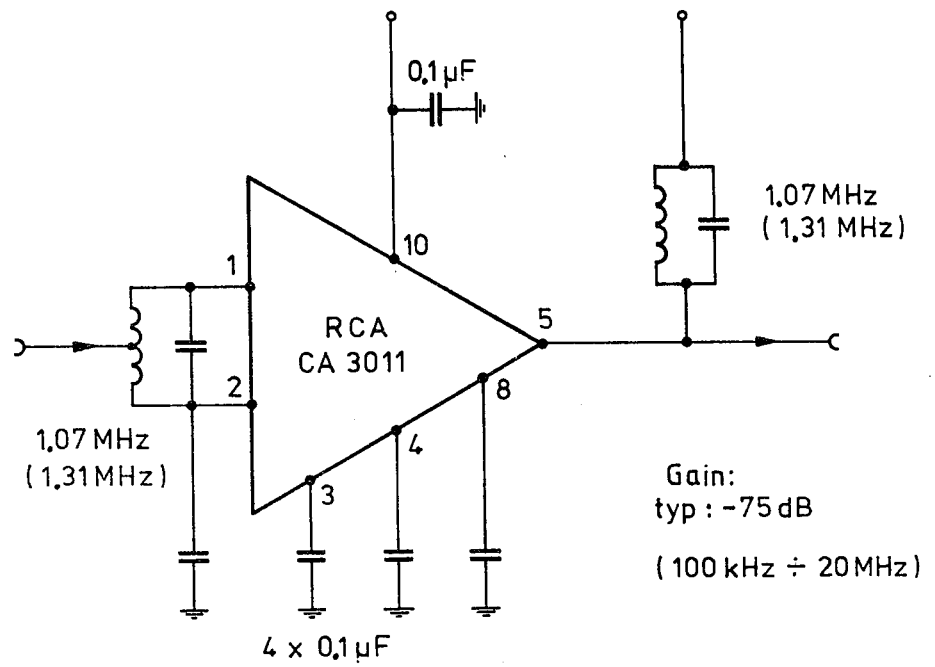
FIG. 9 is a circuit diagram of one embodiment of a narrowband FM filter for the circuits of FIGS. 6 and 7.

FIG. 9 illustrates one circuit which is suitable as filter 21 or 22 and simultaneously as an amplifier for the FM intermediate frequency audio signals. Such a component can be based, for example, on an RCA broadband amplifier IC CA 3011. The circuit shown in FIG. 9 constitutes the filters 21 and 22 in FIG. 4-7 and 13 in combination with an additional amplification.

For the notch filter N, an embodiment has been tested in which the notch filter was composed of four filters of the type employed in commercially available color television receivers for the suppression of the chrominance subcarrier in the Y channel, which filters had been modified, i.e. converted to a different frequency and bandwidth.

Figure 10:
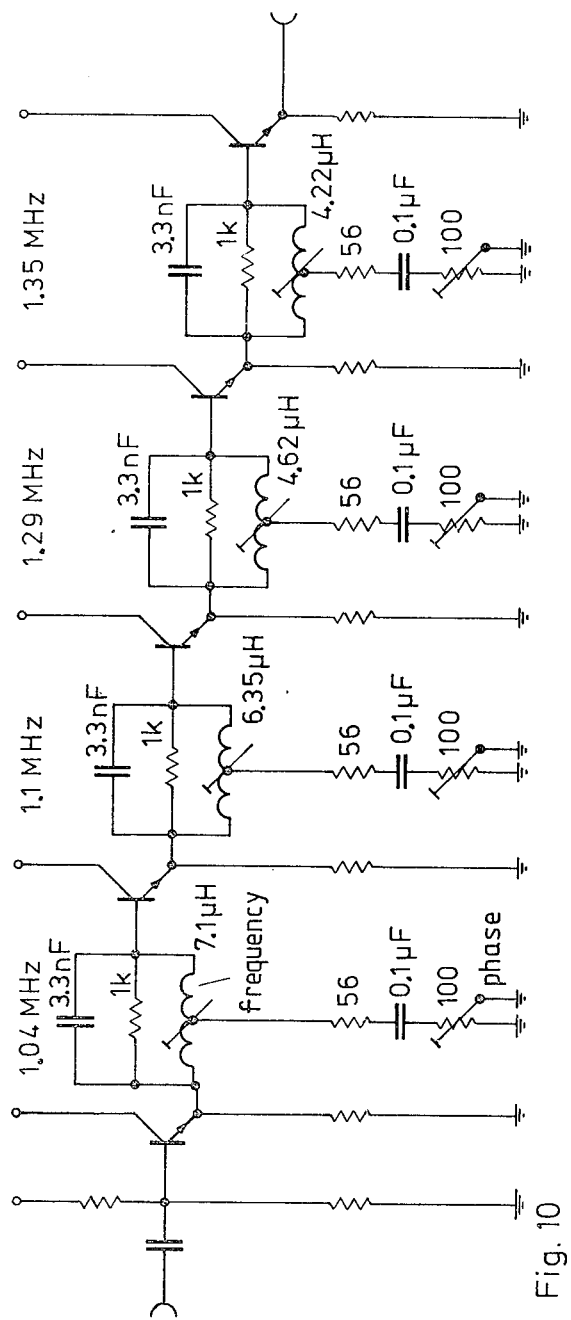
FIG. 10 is a circuit diagram of one embodiment of a notch filter for the circuits of FIGS. 5 and 7.
Figure 11:
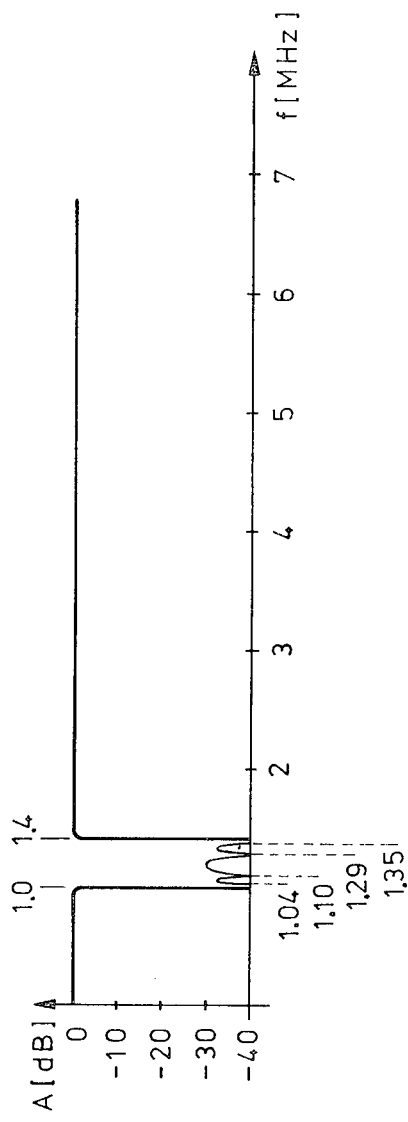
FIG. 11 is a signal diagram showing the characteristic of the notch filter combination of FIG. 10.

FIG. 10 illustrates one suitable embodiment of the notch filter N, and FIG. 11 shows a characteristic of the filter of FIG. 10 in which the component filters are dimensioned in such a manner that their extreme blocking points lie at the edges of the band.

Figure 12:
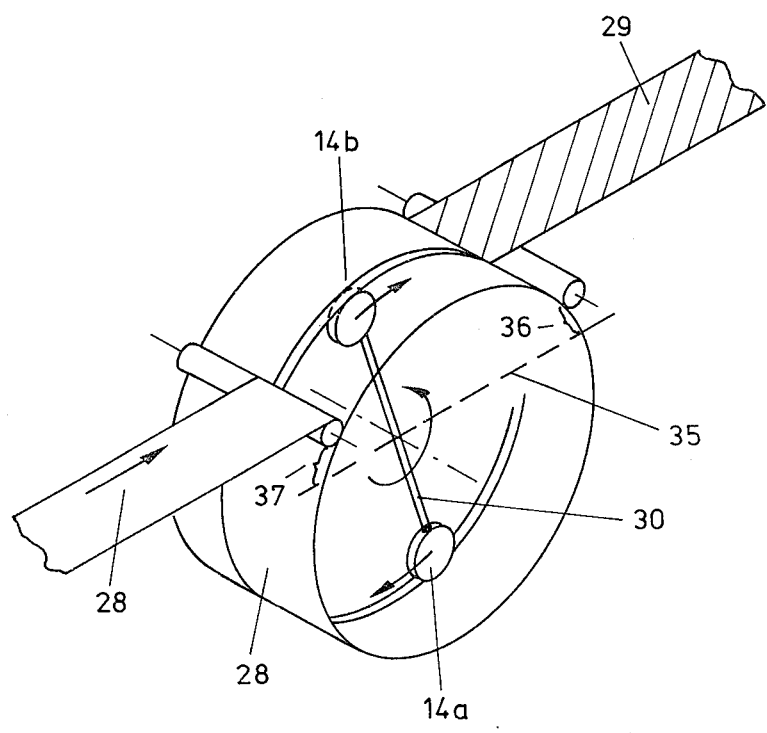
FIG. 12 is a schematic perspective view of the recording head structure of a recorder used in the practice of the invention.

FIG. 12 is a perspective representation of the structure of a head wheel with a tape 28 which encloses a head wheel drum. The wheel includes a carrier 30 supporting two diametrically opposed heads 14a, 14b. Tape 28 is wrapped around more than one-half the drum and thus assumes the form of an omega. Signals are recorded along oblique tracks 29 on the tape 28. As can be seen from the position of line 35 passing through the axis of rotation of the heads 14a, 14b, these heads will simultaneously scan tape portions at regions 36 and 37.

In the description above, exemplary frequencies have been given for the audio carrier and the reference carrier. Depending upon the type of use in practice, the exact values set by the standard or simplified values (e.g. 5.7421875 MHz or simply 5.74 MHz for the audio signal LF2) can be used. In a tested embodiment of a PAL device (FIG. 5) the reference carrier source R was a quartz stabilized PAL reference oscillator having a frequency of 4.433618 MHz ±1 kHz, but in most cases the accuracy can be set lower than required for the decoding of the PAL signals. The accuracy must be high enough that the demodulation takes place in the linear region of the demodulator characteristic.

In another embodiment of the invention, the blocking bandwidth is adapted in an advantageous manner to the respective amplitude of the LF audio signal during the suppression of the frequency occupied by the audio carrier in the frequency spectrum of the picture carrier. Thus, the frequency suppression is held as low as required with respect to the respective amplitude of the audio signal. Since the audio signal usually does not have its full amplitude, the sharpness of the picture during playback is improved, statistically speaking, compared to the sharpness obtained with a filter having a constant blocking bandwidth. One such embodiment will be described with reference to FIGS. 13-17.

Figure 13:
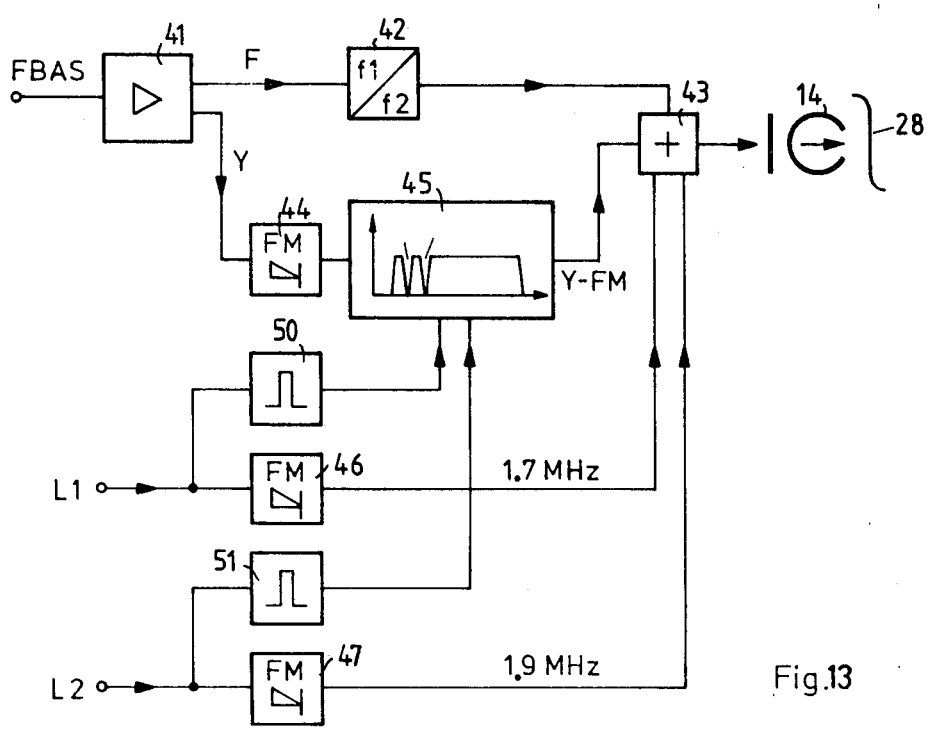
FIG. 13 is a block circuit diagram of a further embodiment of a recording circuit according to the invention.

In FIG. 13, an FBAS signal is fed to the amplifier 41. This amplifier furnishes the modulated PAL chrominance subcarrier F at a frequency of 4.43 MHz. This frequency is reduced in the frequency converter 42 to 0.63 MHz. The thus frequency reduced chrominance subcarrier is fed to the adder stage 43. The amplifier 41 additionally furnishes the luminance signal Y which is modulated in frequency modulator 44 onto a picture carrier. This carrier reaches the filter 45 which permits the frequency spectrum at the output of modulator 44 to pass but has two blocking points at frequencies 1.7 and 1.9 MHz. The picture carrier, Y-FM, modulated with the Y signal is also fed to the adder stage 43.

A first audio signal LF1 is fed to the FM modulator 46 which generates a first audio carrier at the frequency of 1.7 MHz. A second audio signal LF2 is fed to the second FM modulator 47 which generates a second audio carrier at the frequency of 1.9 MHz. The two modulated audio carriers are also fed to the adder stage 43. At the output of the adder stage 43 there is thus available an FBAS signal including a chrominance subcarrier F which has been reduced in frequency, the first audio carrier at the frequency of 1.7 MHz and the second audio carrier at the frequency of 1.9 MHz. This signal is fed to the video head 14 and recorded on the magnetic tape 28. In practice, there are generally provided two video heads which alternately record successive fields on oblique tracks 29 on the magnetic tape 28.

The signal LF1 is also fed to a gating stage 50 which has a threshold value characteristic. If the momentary value of the signal LF1 exceeds a certain value, a setting value appears at the output of stage 50 which increases, in filter 45, the blocking bandwidth centered at the frequency of 1.7 MHz. The frequency range suppressed in filter 45 at the frequency of 1.7 MHz is thus adapted to the respective amplitude of the signal LF1. The audio signal LF2 is fed to stage 51 in the same manner. Its output voltage controls the bandwidth of the suppression in filter 45 at the frequency of 1.9 MHz.

Figure 14:
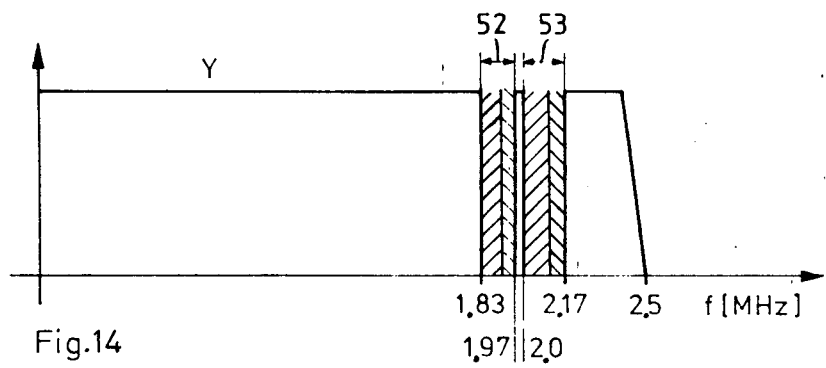
FIGS. 14 and 15 are signal diagrams illustrating the signal spectra at various points in the circuit of FIG. 13.

FIG. 14 shows the blocking bandwidth 52 for the audio carrier at 1.7 MHz and the blocking bandwidth 53 for the audio carrier at 1.9 MHz, each time with reference to the normal frequency band of the Y signal, corresponding to that shown in FIG. 3. To have this effect on the Y signal, the controllable filter would then be disposed in the path of the Y signal, i.e. ahead of the modulator 44, so that during modulation in modulator 44 the frequency components in the region of the two audio carriers would not be produced. The illustrated blocking bandwidths 52 and 53 are thus not constant, but depend on the respective amplitude of the audio signals LF1 and LF2.

Figure 15:
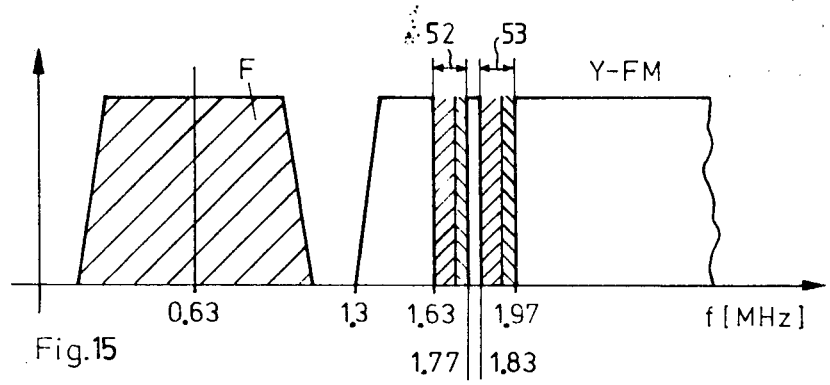

FIG. 15 shows the chrominance subcarrier F with reduced frequency and the frequency spectrum of the modulated picture carrier Y-FM at the output of the filter 45. The illustrated blocking bandwidths 52 and 53 at the illustrated frequencies thus apply for the maximum amplitudes of the audio signals LF1, LF2 and are reduced correspondingly when the amplitude decreases. The static modulation characteristic of the modulator 44 which produces the frequency spectrum shown in FIG. 15 lies between the frequencies of 3.8 MHz for the black value and 4.8 MHz for the white value of the video signal Y.

FIG. 16 shows an embodiment of one part of the controllable filter 45 of FIG. 13. The signal Y-FM is fed via an emitter-follower transistor stage 54 to a resonant circuit 55 which has been tuned to the frequency of 1.7 MHz or 1.9 MHz, respectively, and which is connected, via a further emitter follower stage 56, with an output terminal leading to the adder stage 43. The inductance of the blocking circuit 55 includes two identical windings 57 and 58 which are bifilar windings. The point of connection between the windings 57 and 58, i.e. the center tap of the inductance of the blocking circuit, is connected to ground via a variable resistor 59 and a fixed resistor 60. The resistor 60 is connected in parallel with a transistor 61. Additionally a resistor 62 is connected directly, and a further resistor 63 is connected via a transistor 64, in parallel with the resonant circuit 55. The circuit further includes a gating stage 65 connected to receive one audio signal LF1, and an amplifier 66 connected to apply the output signal from stage 65 to transistors 61 and 64.

FIG. 17 illustrates the control of the filter of FIG. 16 when the latter is tuned to 1.7 MHz. If the audio signal LF1 of FIG. 17a lies below a threshold value $U_S$, the transistors 61 and 64 are blocked. The resistor 63 is then ineffective for the attenuation of the resonant circuit 55. The resistor 60 is not bridged so that the point of connection of the windings 57, 58 is grounded via a high resistance. The filter now has its minimum blocking bandwidth at 1.7 MHz as shown in FIG. 17c.

If the audio signal LF1 exceeds the threshold value $U_S$, the stage 65 is actuated and generates a pulse as shown in FIG. 17b, which travels via amplifier 66 to the bases of the transistors 61 and 64. The transistor 61 then bridges the resistor 60 so that the point of connection of the windings 57, 58 is now grounded via the low resistance presented by resistor 59. The transistor 64 likewise becomes conductive and switches the resistor 63 in parallel with the blocking circuit so that the blocking circuit attenuation is increased. With this increased attenuation of the blocking circuit 55 there results an increased blocking bandwidth as shown in FIG. 17d which is adapted to the greater amplitude of signal LF1.

The blocking bandwidth 53 is controlled in the same way by means of a further filter having the form shown in FIG. 16, but tuned to 1.9 MHz, the two filters being connected in series.

In the illustrated embodiment, the blocking bandwidth is switched between two values as shown in FIGS. 17c and 17d. It is also possible to continuously vary the blocking bandwidths 52 and 53 with the amplitude of the audio signal LF1 or LF2, respectively. It is further possible to feed the audio signal to a rectifier or a filter member, to thereby obtain a setting value which is derived from the mean audio signal amplitude and to control the blocking bandwidth 52 or 53, respectively, with this setting value.

Suitable arrangements for deriving synchronizing signals from the oblique tracks of a tape recorded according to the invention are described in German Specification Nos. P 30 11 635 and P 31 15 670.

For application of the invention to process the television signals employed in the U.S. the frequencies of the sound carrier are adapted to the intercarrier frequency of 4.5 MHz of the sound carrier in the NTSC color television system.

Together with the two sound carriers there can be recorded in the same way a pilot carrier which indicates whether sound transmission is mono, stereo or a transmission in two different languages. This pilot carrier has a frequency of 55 kHz and is unmodulated in case of mono, amplitude-modulated with 117.5 Hz in case of stereo and amplitude-modulated with 274.1 MHz in case of transmission of two different languages.

It will be understood that the above description of the present invention is susceptible to various modifications, changes and adaptations, and the same are intended to be comprehended within the meaning and range of equivalents of the appended claims.

What is claimed is:

1. In a video tape recorder for recording a television signal composed of a picture carrier which has been frequency modulated with a video luminance signal, a chrominance subcarrier which has been modulated with a chrominance signal, and a plurality of frequency separated audio carrier signals each composed of an audio carrier which has been frequency modulated with a respective audio signal along a recording track, and for playing such a signal, the improvement comprising a recorder portion including means for reducing the audio carrier signals in frequency by difference formation of the television signal audio carrier signals with a stabilized reference frequency signal, and for recording the reduced frequency audio carrier signals with their original frequency separation in a frequency band located, in the recorded signal, essentially between the frequency spectrum of the modulated chrominance subcarrier and a location in the frequency spectrum of the modulated picture carrier, and a playback portion including means for returning the reduced frequency audio carrier signals to their original frequency levels by sum formation with the reference frequency signal.

2. Recorder as defined in claim 1 wherein the frequency spectrum of the modulated chrominance subcarrier is in a lower frequency range than the modulated picture carrier, said recorder portion establishes a frequency region between the modulated chrominance subcarrier and the modulated picture carrier sufficient to accommodate the audio carrier signals with a frequency spacing corresponding to the transmitting standard, and said recorder portion comprises filter means having a steep characteristic defining the frequency bands for the modulated chrominance subcarrier and for the modulated picture carrier, said filter means delimiting the frequency band between the limits of the bands of the modulated subcarrier and the modulated picture carrier to cover the region required for the audio carrier signals.

3. Recorder as defined in claim 1 for PAL color television signals, comprising a reference frequency signal source in the form of a reference oscillator tuned to the PAL chrominance subcarrier frequency.

4. Recorder as defined in claim 1 comprising a quartz stabilized reference frequency signal source.

5. Recorder as defined in claim 1 for SECAM color television signals, comprising a stabilized resonant circuit constituting a reference frequency signal source.

6. Recorder as defined in claim 5 wherein said resonant circuit is a quartz stabilized circuit tuned to the PAL frequency standard G.

7. Recorder as defined in claim 1 comprising a reference frequency signal source constituted by a quartz stabilized oscillator.

8. Recorder as defined in claim 1 wherein: said means for reducing the audio carrier signals in frequency and said means for returning the reduced frequency audio carrier signals to their original frequency levels are together constituted by two mixers, one for each audio carrier signal, and a source of the stabilized reference frequency signal; said recorder portion comprises means for applying each audio carrier signal of the television signal to a respective mixer and for applying the reference frequency signal provided by said source to each said mixer for causing each mixer to produce a respective reduced frequency audio carrier signal at a frequency equal to the difference between the frequencies of the signals applied to that mixer; and said playback portion comprises means for applying each reduced frequency audio carrier signal in the played back signal to a respective mixer and for applying the reference frequency signal provided by said source to each said mixer for causing each mixer to produce a respective audio carrier signal at the frequency level of the corresponding audio carrier signal applied by said applying means in said recorder portion.

9. Recorder as defined in claim 8 wherein said playback portion comprises means for feeding the audio carrier signals produced by said mixers under control of said playback portion to an antenna modulator at the output of said recorder.

10. Recorder as defined in claim 1 wherein the television signal includes a pilot carrier defining the type of audio carrier modulation, and further comprising means associated with said recorder portion for reducing the pilot carrier frequency by the frequency of the reference frequency signal for recording, and means associated with said playback portion for increasing the frequency of the reduced frequency pilot carrier by the frequency of the reference frequency signal for playback.

11. Recorder as defined in claim 1 wherein said recorder portion comprises a common filter having spaced pass bands defining the frequency spectra of, respectively, the modulated chrominance subcarrier and the modulated picture carrier and composed of a series connection of a plurality of component filters presenting two zero positions at the locations of the edges of the two pass bands which border the space between the pass bands.

12. Recorder as defined in claim 11 wherein there are four of said component filters.

13. Recorder as defined in claim 1 wherein one of said portions comprises separate filters associated, respectively, with the modulated picture carrier and the modulated chrominance subcarrier.

14. Recorder as defined in claim 1 wherein the reduced frequency audio carrier signals are recorded in a frequency band encompassed by the frequency spectrum of the modulated picture carrier, and said recorder portion comprises: controllable filter means connected for suppressing the portions of the modulated picture carrier in the frequency band of at least one reduced frequency audio carrier signal and presenting a stop band having a controllably variable bandwidth; and control means connected for varying the bandwidth of the stop band of said filter means as a function of the amplitude of the audio signal modulating the at least one audio carrier signal in a direction to increase the bandwidth in response to an increase in the audio signal amplitude.

15. Recorder as defined in claim 14 wherein said control means act to switch the bandwidth of the stop band of said filter means to a larger value whenever the instantaneous amplitude of the associated audio signal exceeds a threshold value.

16. Recorder as defined in claim 14 wherein said filter means includes a blocking circuit in its signal conducting path to which said control means are connected.

17. Recorder as defined in claim 16 wherein said blocking circuit comprises an inductor having a center tap, and means defining a resistive path connecting said center tap to ground, and said control means are connected for reducing the resistance of said resistive path when the audio signal amplitude increases.

18. Recorder as defined in claim 17 wherein said inductor is constituted by a bifilar winding.

* * * * *